United States Patent
Nagata et al.

(10) Patent No.: US 8,930,069 B2
(45) Date of Patent: Jan. 6, 2015

(54) IN-VEHICLE SYSTEM REMOVING A FREEZE STATE OF CAR NAVIGATION EQUIPMENT

(75) Inventors: Yuu Nagata, Kobe (JP); Takeshi Yoshida, Kobe (JP); Yuu Funakura, Kobe (JP); Yuichi Ochiai, Nagoya (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 104 days.

(21) Appl. No.: 13/443,451

(22) Filed: Apr. 10, 2012

(65) Prior Publication Data

US 2012/0310522 A1 Dec. 6, 2012

(30) Foreign Application Priority Data

May 30, 2011 (JP) ................. 2011-120009

(51) Int. Cl.
  *G06F 19/00* (2011.01)
  *G06F 1/24* (2006.01)
  *G01C 21/26* (2006.01)
(52) U.S. Cl.
  CPC ............... *G06F 1/24* (2013.01); *G01C 21/265* (2013.01)
  USPC ...................................................... 701/34.4
(58) Field of Classification Search
  None
  See application file for complete search history.

(56) References Cited

U.S. PATENT DOCUMENTS

2008/0059051 A1\* 3/2008 Kumagai et al. ............. 701/117
2009/0292417 A1\* 11/2009 Ishikawa ........................ 701/33

FOREIGN PATENT DOCUMENTS

| | | |
|---|---|---|
| JP | U-61-156312 | 9/1986 |
| JP | A-11-095875 | 4/1999 |
| JP | A-2001-014006 | 1/2001 |
| JP | A-2002-208852 | 7/2002 |
| JP | A-2003-316477 | 11/2003 |
| JP | A-2006-109158 | 4/2006 |
| JP | A-2006-318259 | 11/2006 |
| JP | A-2007-230520 | 9/2007 |
| JP | A-2008-003768 | 1/2008 |
| JP | A-2009-073386 | 4/2009 |
| JP | A-2009-97836 | 5/2009 |
| JP | A-2010-085207 | 4/2010 |

OTHER PUBLICATIONS

Japanese Office Action issued in Application No. 2011-120009; Dated Apr. 23, 2013 (With Translation).
Chinese Office Action dated Apr. 3, 2014 from Chinese Patent Application No. 201210142919.5 (with English-language translation).
Nov. 26, 2013 Notice of Rejection issued in Japanese Patent Application No. 2011-120009 (with English-language translation).

\* cited by examiner

*Primary Examiner* — Thomas Tarcza
*Assistant Examiner* — Adam Alharbi
(74) *Attorney, Agent, or Firm* — Oliff PLC

(57) ABSTRACT

An in-vehicle system according to an embodiment includes a detection unit, a reception unit, and a recovery unit. The detection unit detects a freeze state of a navigation apparatus. The reception unit receives a recovery operation from a user demanding recovery of the navigation apparatus. The recovery unit performs a recovery process for the navigation apparatus upon detection of the freeze state of the navigation apparatus by the detection unit and upon reception of the recovery operation by the reception unit.

6 Claims, 7 Drawing Sheets

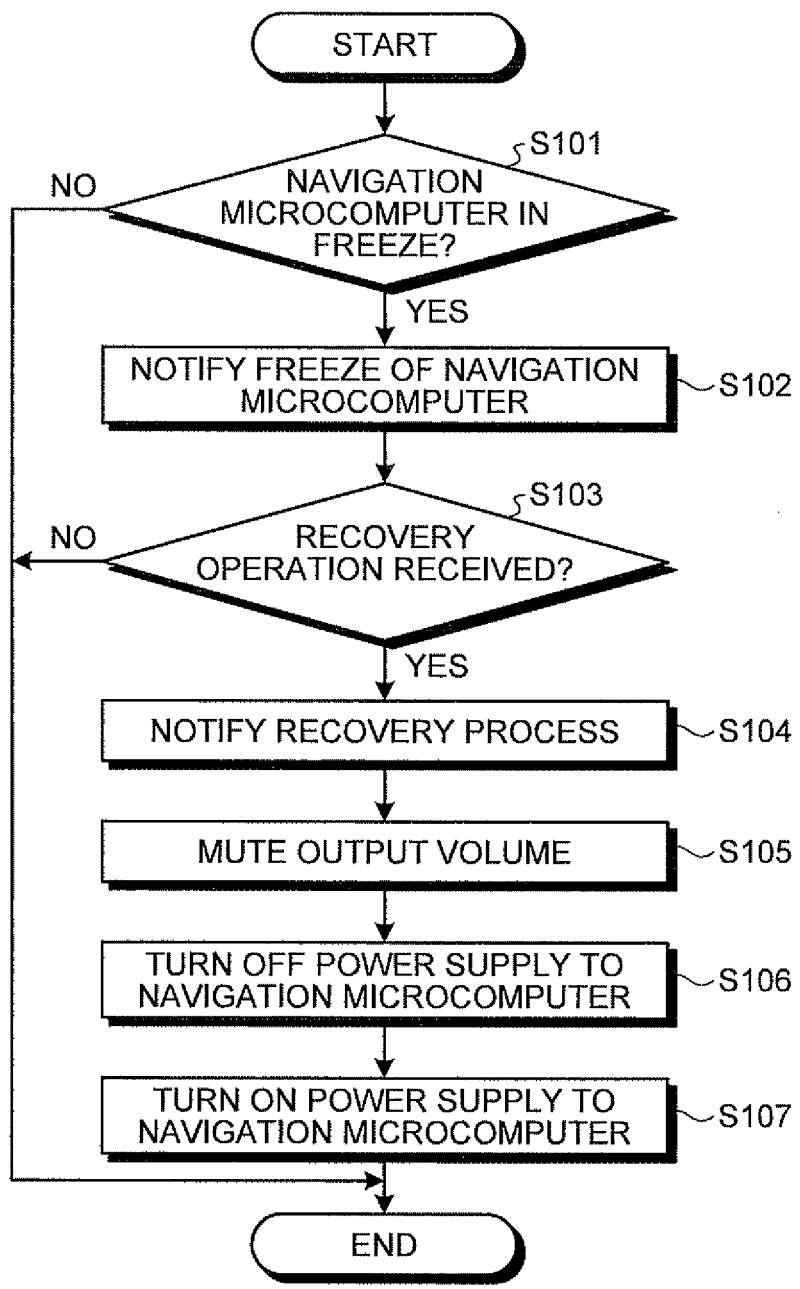

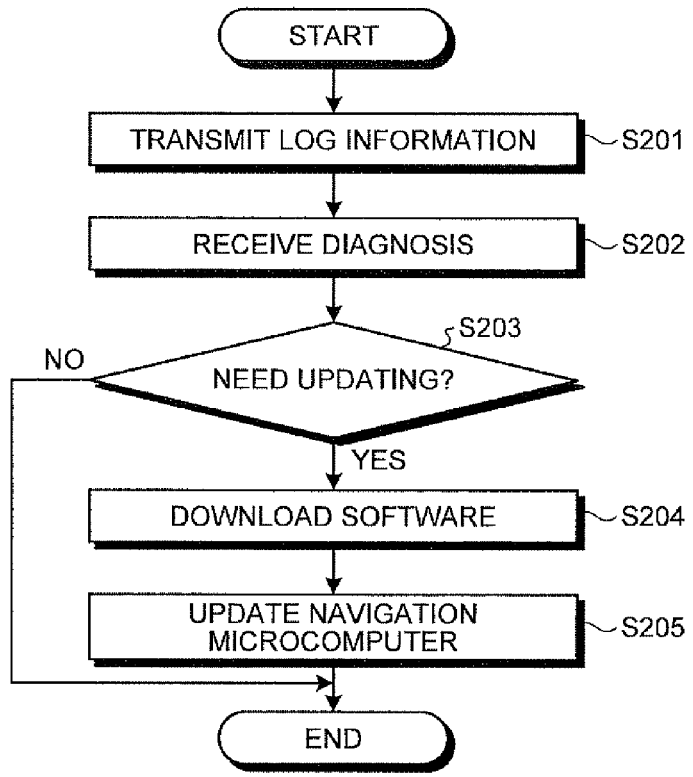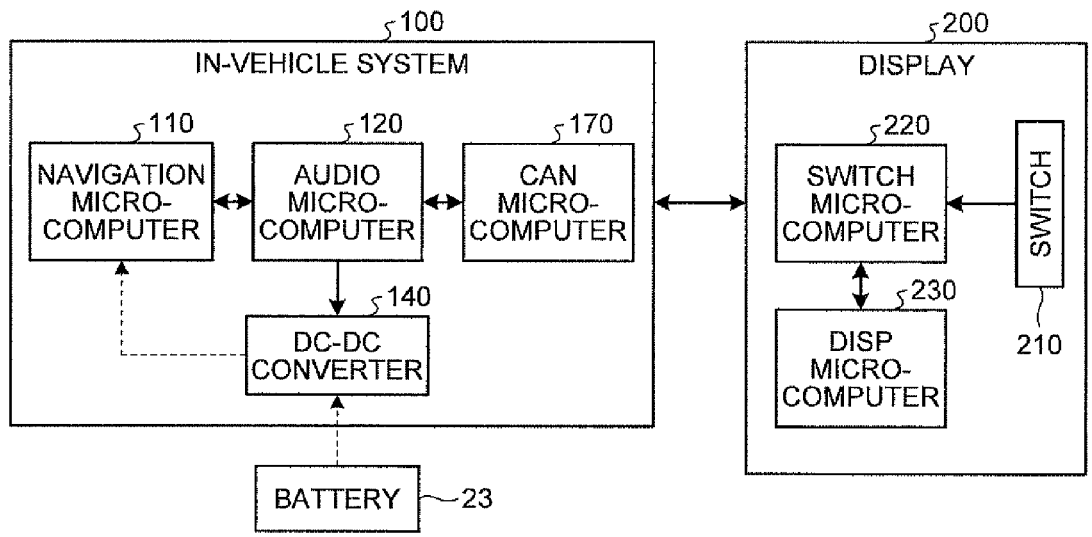

IN-VEHICLE SYSTEM REMOVING A FREEZE STATE OF CAR NAVIGATION EQUIPMENT

CROSS-REFERENCE TO RELATED APPLICATION

This application is based upon and claims the benefit of priority of the prior Japanese Patent Application No. 2011-120009, filed on May 30, 2011, the entire contents of which are incorporated herein by reference.

FIELD

The embodiments disclosed herein relate to an in-vehicle system.

BACKGROUND

An electronic device is known which includes a CPU (Central Processing Unit) and the like for processing various types of software. In the electronic device, a non-responsive state (hereafter referred to as a "freeze state") may be encountered during the processing of software due to one cause or another.

The freeze state of the electronic device may be removed by pressing a reboot button. For example, a portable telephone device is disclosed in which the freeze state is removed based on a predetermined reset signal that is transmitted by pressing a predetermined button.

The above related art is discussed in Japanese Unexamined Patent Publication No. 2008-3768, for example.

However, in an in-vehicle system including an onboard electronic device, such as car navigation equipment, the freeze state cannot be appropriately removed according to the will of the user.

Specifically, in order to remove the freeze state, the part causing the freeze state, such as a navigation control part of the in-vehicle system, needs to be reset. For this resetting operation, power supply may be terminated, or a reset button may be provided and operated.

An in-vehicle system having car navigation equipment and a radio or the like includes a backup power supply (hereafter referred to as a "B/U") directly connected to a battery and an accessory (ACC) power supply (hereafter referred to as an "ACC") connected to the battery via an ACC terminal of an ignition switch. When the vehicle is travelling, both the ACC and the B/U are on. When the ignition switch is off (during parking, for example), the ACC is off while the B/U is on. The in-vehicle system operates when the ACC is on.

Because the freeze state occurs when the in-vehicle system is in an operating state, in order to remove the freeze state, the ACC needs to be turned off; namely, the automobile engine needs to be stopped. This demands a bothersome operation from the user, and stopping the car just so as to remove the freeze state in the middle of driving the vehicle is not a realistic solution.

Furthermore, when the ACC is turned off, not just the part causing the freeze state but also the system as a whole is reset by the turning-off of power supply, resulting in a wastefully extensive and deep resetting operation.

In the case of the resetting process involving the reset button, although a reset can be made when the automobile is travelling, this method also leads to the resetting of not just the part causing the freeze state but also the entire system by the reset button operation, resulting in a wastefully extensive and deep reset. While it is possible to provide a plurality of reset buttons corresponding to different operating states, this results in an increase in the number of reset buttons and cost disadvantage, and may also confuse the user over which one of the reset buttons to choose. Thus, this solution is also not realistic.

In view of the foregoing, there is the problem of how to realize an in-vehicle system capable of appropriately removing the freeze state of car navigation equipment on a vehicle according to the will of the user even when the vehicle is travelling without detracting from convenience.

SUMMARY

Specifically, when the car navigation equipment mounted on the vehicle enters the freeze state, the in-vehicle system stops a supply of power to a navigation microcomputer controlling a navigation function system and then resumes the supply of power, thereby resetting the navigation microcomputer.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 7 is a flowchart illustrating an outline of a recovery process sequence;

FIG. 8 is a flowchart illustrating an outline of an update process sequence; and FIG. 9 is a block diagram of a structure of the in-vehicle system according to a variation.

DESCRIPTION OF EMBODIMENT

In the following, an embodiment of an in-vehicle system disclosed by the present application will be described with reference to the drawings. The embodiment is illustrative and does not limit the present invention.

In the following, an outline of the in-vehicle system according to the embodiment will be described with reference to FIG. 1, and then concrete features and the like of the in-vehicle system will be described with reference to FIGS. 2 through 9.

Figure 1:
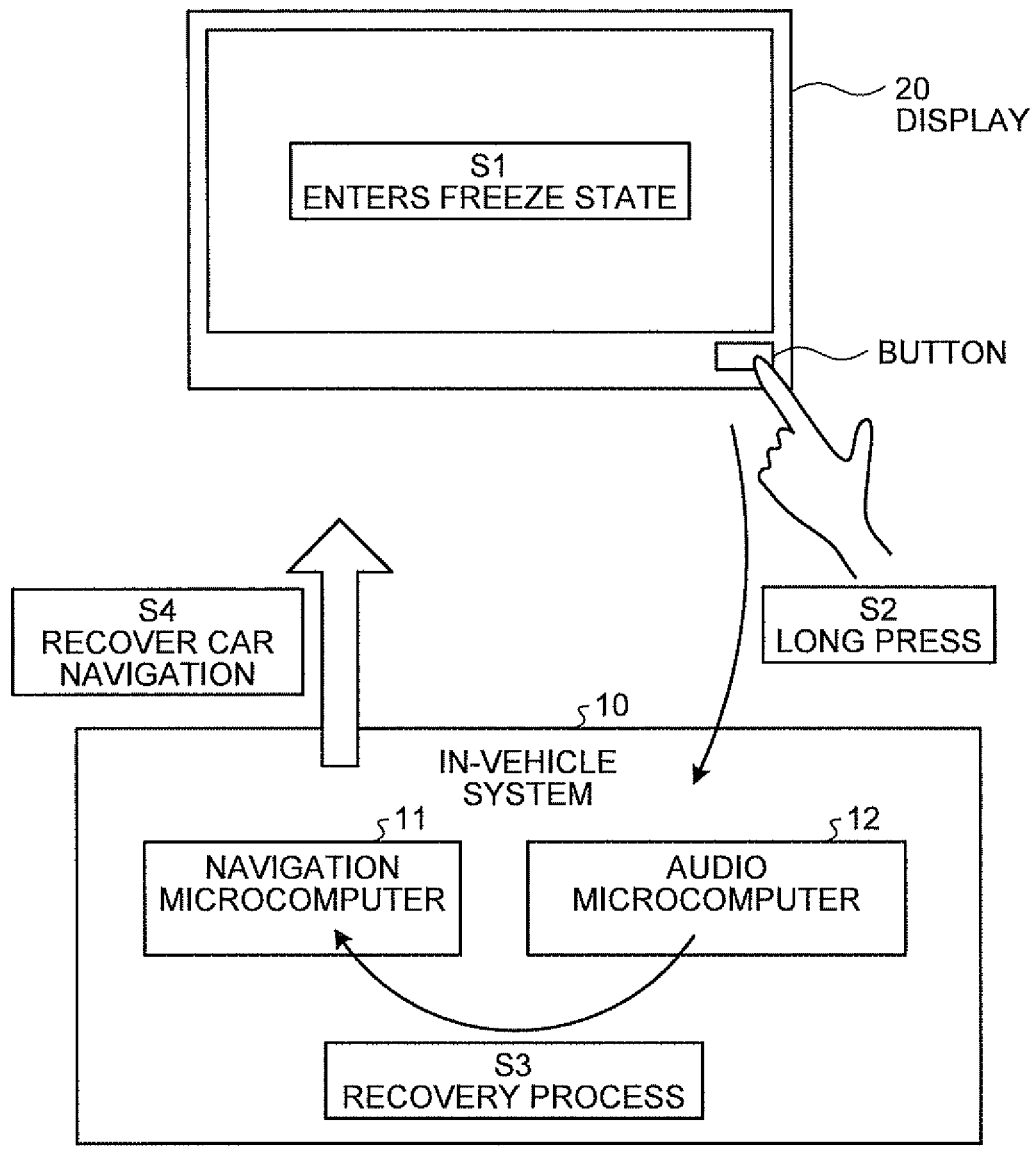
FIG. 1 illustrates an outline of an in-vehicle system according to an embodiment.

FIG. 1 illustrates an outline of the in-vehicle system according to the present embodiment. In a conventional in-vehicle system including car navigation equipment mounted on a vehicle, the freeze state of the car navigation equipment cannot be removed unless ignition is turned off.

In the in-vehicle system according to the present embodiment, when car navigation equipment mounted on a vehicle enters the freeze state, power supply to a navigation microcomputer that controls the function of the car navigation equipment is stopped by a predetermined operation and then resumed so as to reset the navigation microcomputer. Thus, the freeze state can be appropriately removed even when the vehicle is traveling without detracting from convenience.

As illustrated in FIG. 1, the in-vehicle system 10 according to the present embodiment includes an audio microcomputer that may control an audio function system for reproducing sounds from a radio or a CD (Compact Disc); and the navigation microcomputer that may control a navigation function system providing route information including a current position of the vehicle. The audio microcomputer also exerts an overall control of other microcomputers.

To the in-vehicle system 10, a display for displaying the route information provided by the navigation microcomputer and for operating the car navigation equipment or the CD, for example, is connected. When the navigation microcomputer enters the freeze state (step S1), the display cannot display or update the route information including the current position of the vehicle.

In this case, the audio microcomputer in the in-vehicle system 10 receives a recovery operation demanding recovery of the navigation microcomputer based on a predetermined operation. For example, as illustrated in FIG. 1, the audio microcomputer receives the recovery operation for the navigation microcomputer when the user presses a predetermined button continuously for a predetermined time or more (hereafter referred to as a "long press")(step S2).

Upon reception of the recovery operation for the navigation microcomputer, the audio microcomputer turns off power supply to the navigation microcomputer and then resumes the power supply in order to perform a recovery process for the navigation microcomputer (step S3).

Then, the navigation microcomputer is rebooted by the recovery process by the audio microcomputer, whereby car navigation functions are recovered (step S4) and the freeze state is removed.

Thus, when the car navigation equipment enters the freeze state, the in-vehicle system 10 can appropriately remove the freeze state by a long press of the predetermined button even when the vehicle is travelling without detracting from convenience.

While the recovery operation for the navigation microcomputer has been described as being received upon a long press of the predetermined button, this is merely an example. Preferably, a reset button for the recovery operation may be provided.

With reference to FIG. 1, the case has been described in which the button for receiving the recovery operation for the navigation microcomputer is included in the display. Preferably, the recovery operation button may be included in the in-vehicle system 10. This feature will be described later with respect to FIGS. 2 and 3. In the following, the in-vehicle system 10 will be described in detail.

Figure 2:
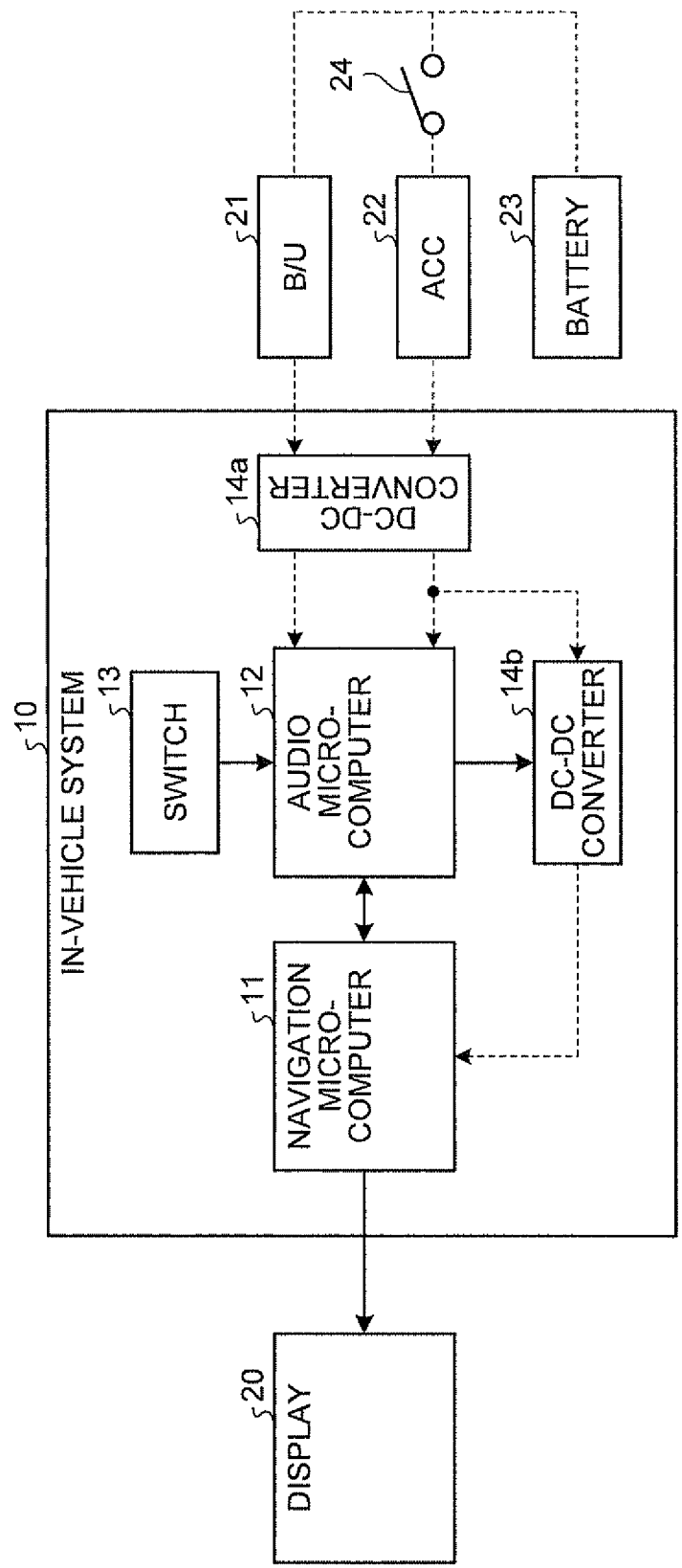
FIG. 2 illustrates an outline of a structure of the in-vehicle system according to the present embodiment.
Figure 3:
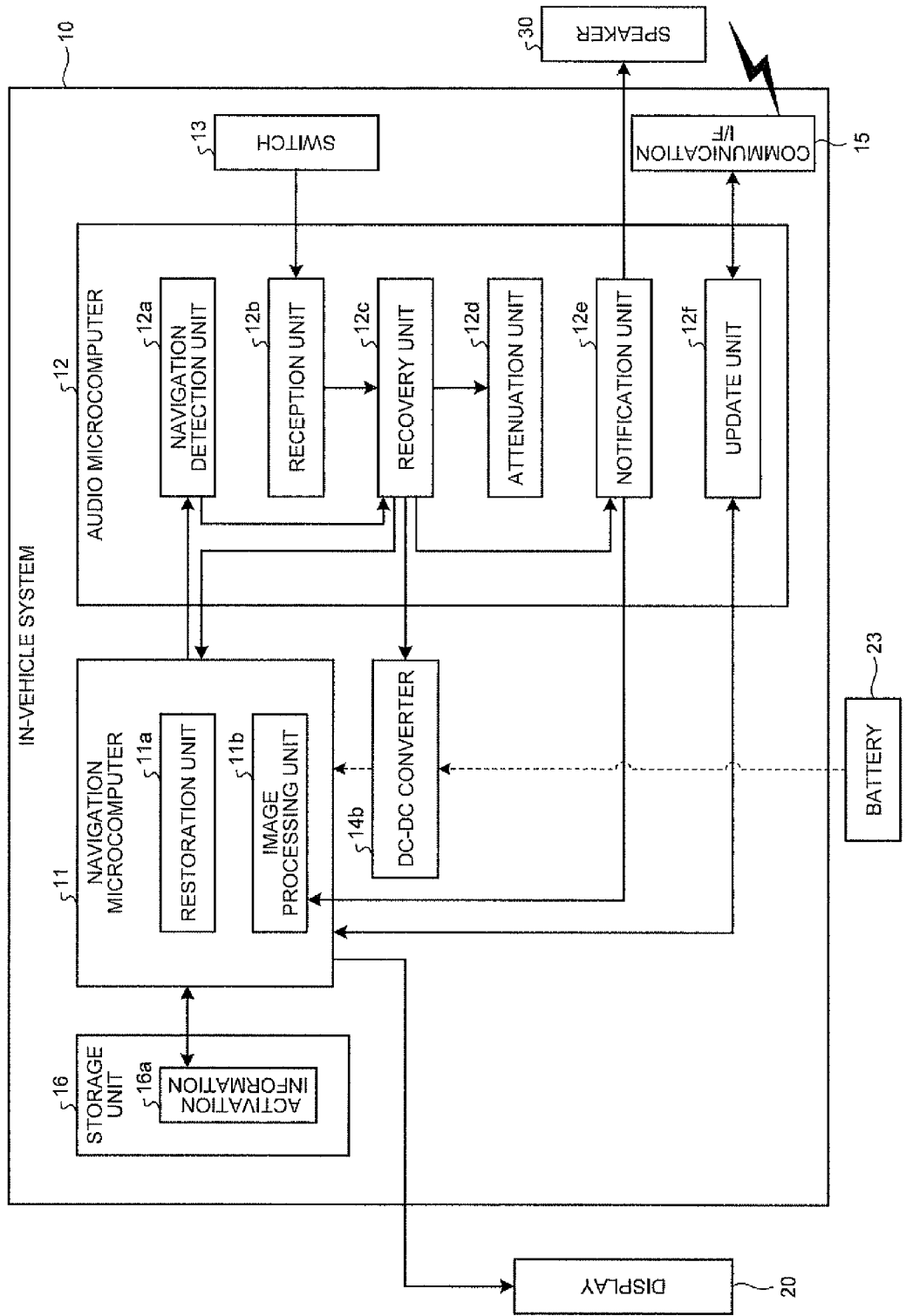
FIG. 3 is a block diagram of the structure of the in-vehicle system according to the present embodiment.

First, the structure of the in-vehicle system 10 according to the present embodiment will be described with reference to FIGS. 2 and 3. FIG. 2 illustrates an outline of the structure of the in-vehicle system 10 according to the present embodiment. FIG. 3 is a block diagram of the structure of the in-vehicle system 10 according to the present embodiment.

As illustrated in FIG. 2, the in-vehicle system 10 according to the present embodiment includes a navigation microcomputer 11, an audio microcomputer 12, a switch 13, and DC-DC converters (regulators) 14a and 14b. To the in-vehicle system 10, a display 20 is also connected.

The navigation microcomputer 11 includes a processing unit for controlling the various constituent elements of the navigation apparatus in order to realize various navigation functions, such as displaying the route information including the current position of the vehicle and map information on the display 20, and issuing route guidance or map guidance via voice guidance.

The in-vehicle system 10 is supplied with power via a B/U (constant backup power supply) 21 line and an ACC (accessory power supply) 22 line from a battery 23. The B/U 21 line is a power supply line directly connected to the battery 23 and constantly supplied with power regardless of an operation position of an ignition switch 24. The ACC (accessory power supply) 22 line is supplied with power when the operation position of the ignition switch is in an ACC position (on-position of power supply to onboard devices) or an on-position (engine-on position). Here, the flow of power supply is indicated by broken lines.

The audio microcomputer 12 includes a processing unit that performs a process for controlling various constituent elements of an audio apparatus in order to realize various audio functions, such as reproducing sound from the radio or the CD (Compact Disc) and outputting voice guidance from the navigation microcomputer 11. Further, the audio microcomputer 12 performs a control of power supply to the navigation microcomputer 11 and the in-vehicle system 10 by controlling the DC-DC converter 14b, for example.

FIG. 2 mainly illustrates the portions of the navigation microcomputer 11 controlled by the audio microcomputer 12, where the constituent elements of the navigation apparatus and the audio apparatus are omitted.

The switch 13 includes an operation button for turning on/off power supply to the audio functions based on a short press (continuous (pressing) operation for a predetermined time or less). The switch 13 also includes the function of an operation button for receiving a recovery operation demanding recovery from the freeze state of the navigation microcomputer 11. In accordance with the present embodiment, the audio microcomputer 12 turns on/off power supply to the navigation microcomputer 11 based on a long press (continuous (pressing) operation for a predetermined time or more) of the switch 13.

The DC-DC converters 14a and 14b include voltage converters. The DC-DC converter 14a supplies power from the battery 23 via the B/U 21 or the ACC 22 to the audio microcomputer 12 by converting a power supply voltage into an operating voltage for the audio microcomputer 12.

The DC-DC converter 14b supplies power from the DC-DC converter 14a to the navigation microcomputer 11 by converting a power supply voltage into an operating voltage for the navigation microcomputer 11. The operation of the DC-DC converter 14b is controlled by the audio microcomputer 12.

The display 20 displays various information, such as navigation information and audio information. The display 20 may include a liquid crystal display panel. For example, upon reception of a notification from the audio microcomputer 12 via the navigation microcomputer 11 that a recovery process for the car navigation equipment is performed, the display 20 displays that information.

The display 20 may also display navigation information such as route information including the vehicle current position and map information, or audio information such as album titles or song titles when a CD reproduction operation is performed.

The display 20 is connected to the audio microcomputer 12 via a CAN (Controller Area Network) microcomputer, not illustrated, that controls an onboard LAN (Local Area Network).

While the switch 13 included in the in-vehicle system 10 and the display 20 are illustrated as separate entities, the display 20 and the switch 13 may be integrated. The details of other structures will be described later with reference to FIG. 9.

Next, the structure of the in-vehicle system 10 will be described in greater detail with reference to FIG. 3. FIG. 3 is a block diagram of the structure of the in-vehicle system 10 according to the present embodiment.

The in-vehicle system 10 according to the present embodiment further includes a communication I/F (interface) 15 and a storage unit 16. The storage unit 16 stores activation information 16a. The navigation microcomputer 11 includes a restoration unit 11a and an image processing unit 11b. The audio microcomputer 12 includes a navigation detection unit 12a, a reception unit 12b, a recovery unit 12c, an attenuation unit 12d, a notification unit 12e, and an update unit 12f. To the audio microcomputer 12, a speaker 30 is connected.

The restoration unit 11a, the image processing unit 11b, the navigation detection unit 12a, the reception unit 12b, the recovery unit 12c, the attenuation unit 12d, the notification unit 12e, and the update unit 12f may actually include functions (functional blocks) realized by processes based on a program in the navigation microcomputer 11 or the audio microcomputer 12. For ease of understanding of operation, the various units will be described in terms of operations or processes performed by the various functional units.

The navigation detection unit 12a includes a processing unit that performs a process for detecting whether the navigation microcomputer 11 is in the freeze state. For example, the navigation detection unit 12a detects the navigation microcomputer 11 in the freeze state when there is no response from the navigation microcomputer 11 within a predetermined time after sending a response request to the navigation microcomputer 11.

The navigation detection unit 12a also performs a process of notifying the recovery unit 12c upon detection of the car navigation equipment in the freeze state.

The reception unit 12b includes a processing unit that performs a process of receiving the recovery operation by detecting a long press of the switch 13. For example, the reception unit 12b detects a state of the predetermined switch 13 as well as other switches by using a method such as key matrix scan. Upon detection of pressing of the switch 13 continuously for a time longer than a predetermined threshold time, the reception unit 12b determines that a long press has been made and receives the recovery operation. In accordance with the present embodiment, the time in which the switch 13 is pressed continuously will be referred to as a "pressing time".

Figure 4:
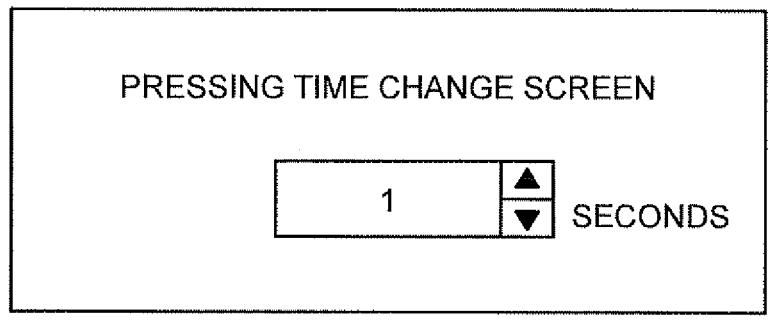
FIG. 4 illustrates a pressing time change screen.

The threshold value of the pressing time may be changed by the user. A pressing time change screen will be described with reference to FIG. 4. FIG. 4 illustrates the pressing time change screen.

When an item "pressing time change", for example, is selected from a menu screen of the car navigation equipment, the in-vehicle system 10 causes the pressing time change screen illustrated in FIG. 4 by way of example to be displayed on the display 20. Then, the threshold value of the pressing time is changed to a time set by user operation.

The illustrated screen allows the direct input of the pressing time threshold value. Preferably, a method may be employed whereby a set time is selected from a plurality of pressing time candidates displayed. In another method, a message may be displayed prompting the user to perform a pressing operation continuously for a threshold value time, and then the time for which the user has actually performed the pressing operation continuously may be set as the threshold value.

The setting of the threshold value for the long-press determination may be set not just for the determination of the "recovery operation" but also commonly for a determination of another switch (configured to select different operations depending on the long-press operation or the short-press operation).

Referring back to FIG. 3, the structure of the in-vehicle system 10 will be further described. The recovery unit 12c includes a processing unit that performs a recovery process for the car navigation equipment upon reception of the recovery operation when the car navigation equipment is in the freeze state.

Specifically, the recovery unit 12c first instructs the attenuation unit 12d to set the output volume to a no-sound state (hereafter referred to as "mute"). The recovery unit 12c then terminates the supply of power to the navigation microcomputer 11 and, as required, a predetermined portion of the in-vehicle system 10, and thereafter supplies power to the navigation microcomputer 11 and the predetermined portion of the in-vehicle system 10.

Thus, according to the present embodiment, the supply of power to the navigation microcomputer 11 is terminated so as to reset the navigation microcomputer 11. This operation is equivalent to the conventional shutting of power supply by turning off the ACC using the ignition key. Accordingly, an early recovery or a recovery to a state close to the pre-freeze state can be made without supplying a reset signal to a reset terminal of the navigation microcomputer 11 or involving an excessive reset (i.e., a deep reset involving initialization of protected data or a peripheral device recognizing operation, for example), such as the shutting down of power supply including the backup line.

Thus, the recovery unit 12c shuts down power supply to the navigation microcomputer 11 and the in-vehicle system 10 and then resumes the power supply so as to reboot the navigation microcomputer 11, so that the car navigation equipment can be recovered from the freeze state by reboot. When performing the recovery process for the car navigation equipment, the recovery unit 12c also performs a process of notifying the notification unit 12e.

Upon reception of an instruction for muting the output volume from the recovery unit 12c, the attenuation unit 12d may perform a control for setting the gain of a power amplifier driving the speaker 30 to zero, or a control for shutting an audio signal transmission path to the speaker 30, for example, so that no sound is output from the speaker 30.

When power supply to various circuits in a sound reproduction system is suddenly terminated, a popping noise unpleasant to the user (hereafter referred to as a "popping sound") is produced. The "popping sound" may also be produced when power supply to the navigation microcomputer 11 is disconnected, due to the influence of shut-down of power supply to a navigation-related sound circuit (such as a circuit for voice guidance).

The "popping sound" can be prevented by suppressing (or eliminating) the output volume, i.e., by setting the output volume to the mute state as described above at the time of terminating power supply.

The notification unit 12e includes a processing unit that, upon reception of the notification that the recovery process for the car navigation equipment will be performed by the recovery unit 12c, performs a process of notifying the image processing unit 11b so that the display 20 can make a display to that effect. The notification unit 12e also performs a process of notifying the user via sound output from the speaker 30 upon reception of the notification that the recovery process for the car navigation equipment will be performed.

Figure 5A:
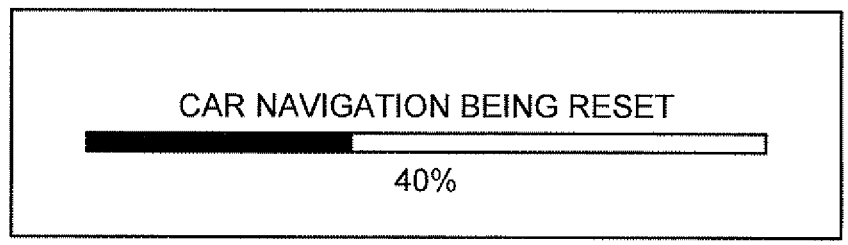
FIGS. 5A and 5B illustrate notification screens for a recovery process for a navigation microcomputer.
Figure 5B:
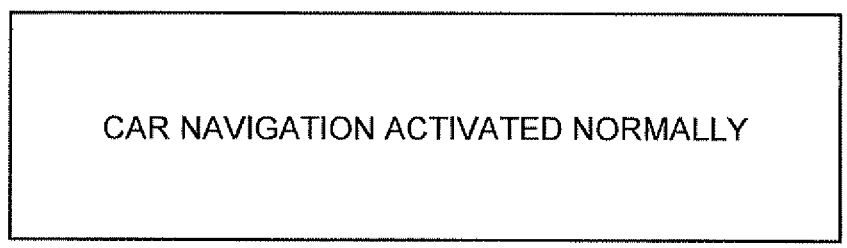

A notification screen for notification by the notification unit 12e will be described in detail with reference to FIGS. 5A and 5B. FIGS. 5A and 5B illustrate notification screens for the recovery process for the navigation microcomputer 11.

The notification unit 12e causes a message indicating an ongoing recovery process to be displayed on the display 20 while the recovery process for the car navigation equipment is being performed by the recovery unit 12c. For example, as illustrated in FIG. 5A, the notification unit 12e causes the display of a message "Car navigation being reset", with a status bar indicating the progress of the recovery process.

It is possible that the car navigation equipment is not in the freeze state even when the recovery operation has been received by the reception unit 12b. For example, the switch 13 may be erroneously long-pressed by the user mistaking an activation of a screen saver or a standby state or a sleep state of the car navigation equipment for a freeze state.

Thus, when the recovery operation is received by the reception unit 12b and the car navigation equipment is not in the freeze state, the notification unit 12e causes the display 20 to indicate the absence of the freeze state, as illustrated in FIG. 5B. In this case, no recovery operation, i.e., reset process, is performed.

In the present example, the display 20 is notified of the start of a recovery process, an ongoing recovery process, or the absence of the freeze state. Preferably, voice guidance or a beep sound (or a buzzer sound, which may be produced by generating a continuous pulse signal of an audible frequency band using a microcomputer and supplying the pulse signal to a sound converter, such as a speaker) may be output to the speaker 30.

Referring back to FIG. 3, the description of the in-vehicle system 10 will be continued. The notification unit 12e also performs a process of issuing a notification when the car navigation equipment enters the freeze state.

For example, the notification unit 12e issues the notification of the freeze state by changing the color of backlight of the switch 13 or the display 20, or by blinking the backlight. Alternatively, the notification unit 12e may issue the notification of the freeze state by varying a tilt angle of a panel portion including the display 20 of the car navigation equipment.

The update unit 12f includes a processing unit that performs a process of inquiring an external apparatus (such as a server at the manufacturer's service center) about the cause of the freeze state of the navigation microcomputer 11 via the communication I/F 15, and updating software of the navigation microcomputer 11 depending on the cause. The details of the update process for the software of the navigation microcomputer 11 will be described later with reference to FIGS. 6 and 8.

The DC-DC converter 14b includes a voltage converter that supplies power to the navigation microcomputer 11 by converting the battery voltage into an operating voltage for the navigation microcomputer 11. The operation of the DC-DC converter 14b, such as the turning-on/off of the converted voltage output, is controlled by the audio microcomputer 12. Here, too, the flow of power supply is indicated by broken lines.

The communication I/F 15 is connected to an antenna, not illustrated, for transmission and reception of wireless radio waves and the like. The communication I/F 15 includes a communication device for performing wireless communications including transmission and reception of data between the external apparatus and the in-vehicle system 10 by using optical communication or radio wave communication, for example.

The storage unit 16 includes memory devices such as standby RAM (Random Access Memory) that retains stored content even during ignition-off by having power supplied from the battery, non-volatile memory, and a hard disk drive. The storage unit 16 stores activation information 16a.

The activation information 16a includes information indicating the latest operation state of the navigation microcomputer 11 or the audio microcomputer 12. The activation information is used for restoring the navigation microcomputer 11 and, as necessary, the audio microcomputer 12, back to the state immediately before the navigation microcomputer 11 enters the freeze state.

The activation information 16a may include a map scale, a destination, and search route information in the car navigation equipment immediately before the freeze state. The activation information 16a may also include a radio channel being reproduced or the name of a song being reproduced from a CD.

Preferably, the activation information 16a may record the above items in association with their activation time or operation time. Namely, the activation information 16a may record log information such as activation or operation history for utilization in the quest for the cause of the freeze state of the car navigation equipment.

The restoration unit 11a includes a processing unit that performs a process for restoring the navigation microcomputer 11 back to the state before the freeze state based on the activation information 16a when the navigation microcomputer 11 is rebooted by the recovery process by the recovery unit 12c.

Upon reception of the notification from the notification unit 12e that the recovery process for the car navigation equipment will be performed, the image processing unit 11b causes the display 20 to make a display to that effect.

Figure 6:
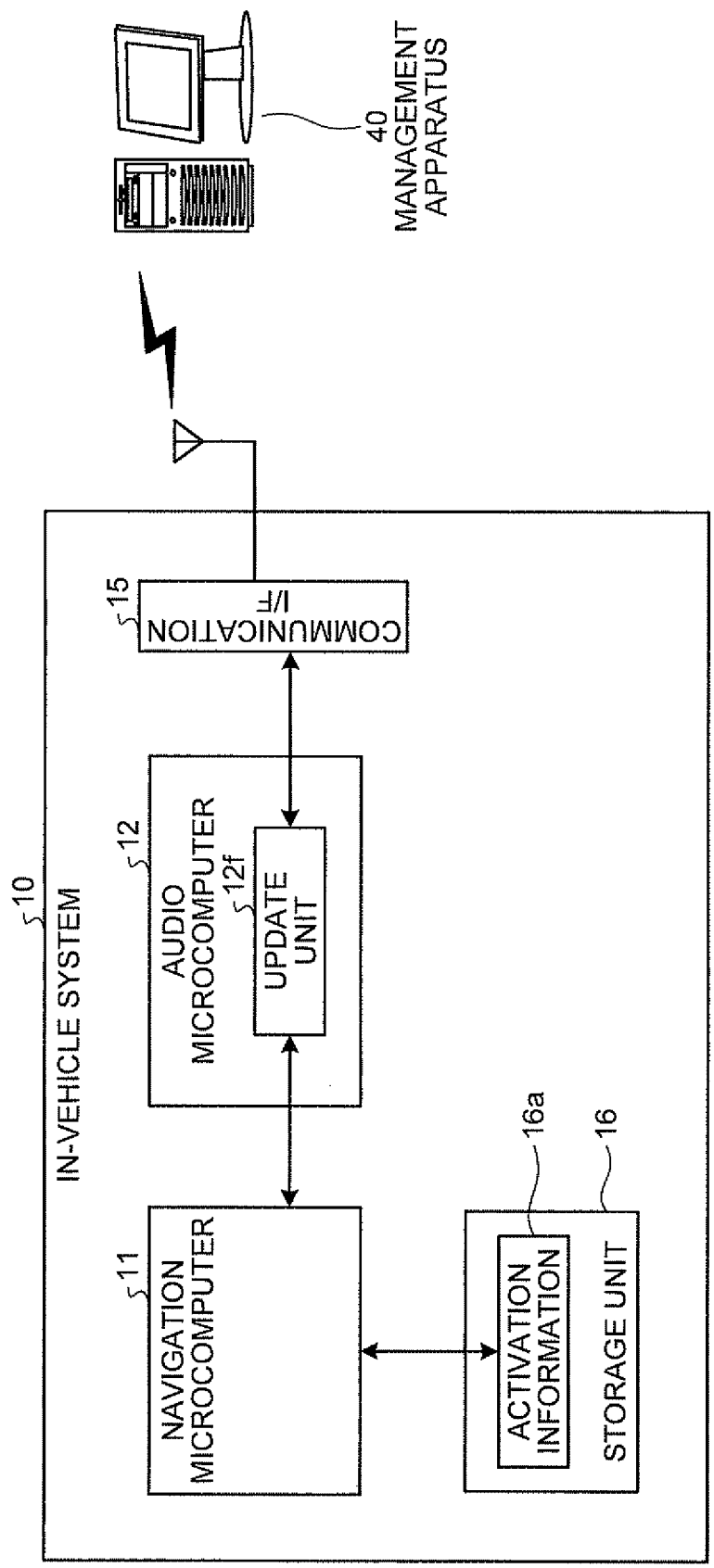
FIG. 6 illustrates an update process for the navigation microcomputer.

Next, the details of the process of updating the navigation microcomputer 11 performed by the update unit 12f of the audio microcomputer 12 will be described with reference to FIG. 6. FIG. 6 illustrates the update process for the navigation microcomputer 11.

As illustrated in FIG. 6, the communication I/F 15 is connected to an antenna for transmission and reception of radio wave and the like so that data can be received from or transmitted to the management apparatus 40, which is the external apparatus. The management apparatus 40 may manage information about the software of the navigation microcomputer 11 or problems therein.

The update unit 12f of the in-vehicle system 10 transmits the log information stored in the activation information 16a to the management apparatus 40, and inquires about the cause of the freeze state of the navigation microcomputer 11. The management apparatus 40 diagnoses the cause based on the log information received from the in-vehicle system 10, and transmits a diagnosis to the in-vehicle system 10.

The update unit 12f, based on the cause of the freeze state of the navigation microcomputer 11 as received from the management apparatus 40, may download software from the management apparatus 40 and update the software of the navigation microcomputer 11 when the software of the navigation microcomputer 11 needs updating. Thus, the in-vehicle system 10 can prevent the navigation microcomputer 11 from entering the freeze state again due to the same cause.

While the cause of the freeze state of the navigation microcomputer 11 has been described as being diagnosed by the management apparatus 40, the cause may be diagnosed by the update unit 12f. Further, while the software of the navigation microcomputer 11 has been described as being updated by the update unit 12*f* based on the cause, the software may be updated manually by the user based on a notification of the need for software update.

While it has been described that the process of updating the software of the navigation microcomputer 11 is performed when the navigation microcomputer 11 enters the freeze state, the embodiment is not limited to such timing.

Preferably, the update unit 12*f* may update the software of the navigation microcomputer 11 by transmitting a version number, a release date, or an updating date of software to the management apparatus 40 regularly.

Thus, the in-vehicle system 10 can prevent the navigation microcomputer 11 from entering the freeze state by updating the software of the navigation microcomputer 11. While the process of updating the navigation microcomputer 11 has been described as being performed by the audio microcomputer 12, the update process may be performed by the navigation microcomputer 11. When the software update is performed as a result of the occurrence of the freeze state, it may be necessary to store information about the development of the freeze state or a software update application state by a flag process or the like.

Next, the details of the recovery process for the navigation microcomputer 11 performed by the audio microcomputer 12 will be described with reference to FIG. 7. FIG. 7 is a flowchart of an outline of a recovery process sequence. This process is performed repeatedly during the operation of the in-vehicle system.

First, the navigation detection unit 12*a* detects whether the navigation microcomputer 11 is in a freeze (step S101). Upon detection of the navigation microcomputer 11 in a freeze ("Yes" in step S101), the notification unit 12*e* issues a notification to that effect (step S102).

On the other hand, when the navigation microcomputer 11 is not in a freeze ("No" in step S101), the navigation detection unit 12*a* ends a series of the present recovery process. This process is repeated, so that the process of detecting whether the navigation microcomputer 11 is in the freeze is continued.

The reception unit 12*b* determines whether the recovery operation demanding recovery of the navigation microcomputer 11 has been received (step S103). When it is determined that the recovery operation has been received ("Yes" in step S103), the notification unit 12*e* issues a notification via voice guidance or a beep sound indicating that the recovery process will be started (step S104).

Upon determining that the recovery operation has not been received ("No" in step S103), the reception unit 12*b* ends a series of the present recovery process. This process is repeated, so that the determining process of step S103 is continued until the recovery operation is received.

Then, the attenuation unit 12*d* mutes the output volume (step S105). The recovery unit 12*c* turns off power supply to the navigation microcomputer 11 and the in-vehicle system 10 (step S106) and then resumes the power supply (step S107), thereby completing a series of the present recovery process performed by the audio microcomputer 12.

The time between the turning-off of power supply to the in-vehicle system 10 and the resumption of power supply needs to be longer than a time for full reset. Namely, the time needs to be longer than a time in which the residual electric charge due to a capacitive component in the power supply circuit is discharged and an on-state of the in-vehicle system 10 due to the residual electric charge is eliminated.

Next, the details of the process of updating the software of the navigation microcomputer 11 performed by the audio microcomputer 12 will be described with reference to FIG. 8. FIG. 8 is a flowchart of an outline of the update process sequence. This process is performed after the navigation microcomputer 11 is recovered from a freeze. Preferably, the process may be performed regularly at the time of update operation by the user, for example.

First, the update unit 12*f* transmits the log information in the activation information 16*a* to the management apparatus 40 (step S201) and inquires about the cause of the freeze state of the navigation microcomputer 11. The update unit 12*f* then receives a diagnosis made by the management apparatus 40 (step S202).

Thereafter, the update unit 12*f*, based on the received diagnosis, determines whether updating of the navigation microcomputer 11 is necessary (step S203). When the updating is necessary ("Yes" in step S203), the update unit 12*f* downloads update software for the navigation microcomputer 11 from the management apparatus 40 (step S204).

The update unit 12*f* then updates the navigation microcomputer 11 with the downloaded software (step S205), thus completing a series of the update process performed by the audio microcomputer 12.

On the other hand, when the update unit 12*f* determines that no updating is necessary in step S203 ("No" in step S203), the process ends.

While it has been described that the in-vehicle system 10 includes the switch 13 for receiving the recovery operation for the navigation microcomputer 11 and that the display 20 is connected to the in-vehicle system 10, the embodiment is not limited to such a structure.

In the following, a variation of the structure of the in-vehicle system will be described. FIG. 9 is a block diagram of a structure of an in-vehicle system 100 according to the variation.

As illustrated in FIG. 9, the variation differs from the structure illustrated in FIG. 2 in that a display 200 connected to the in-vehicle system 100 includes a switch 210 for receiving the recovery operation for a navigation microcomputer 110.

Specifically, the display 200 includes a display apparatus integrating an operating unit and a display unit. For example, the display 200 includes a touch panel type liquid crystal display that receives an input based on the sensing of pressure and that also functions as a display.

The in-vehicle system 100 further includes a CAN microcomputer 170 that controls an onboard LAN (Local Area Network). The display 200 further includes a switch microcomputer 220 that controls the switch 210, and a display (DISP) microcomputer 230 that controls a display on the display 200.

The switch microcomputer 220 receives the recovery operation by detecting a long press of the switch 210 when the car navigation equipment is in the freeze state, and then sends an instruction for recovering the navigation microcomputer 110 to the in-vehicle system 100.

Upon reception of the instruction for recovering the navigation microcomputer 110 from the switch microcomputer 220 via the CAN microcomputer 170, the audio microcomputer 120 in the in-vehicle system 100 performs a recovery process for the navigation microcomputer 110.

A DC-DC converter 140 supplies power to the navigation microcomputer 110 from the battery 23 by converting the voltage to an operating voltage for the navigation microcomputer 110. The operation of the DC-DC converter 140 is controlled by the audio microcomputer 120.

The recovery process for the navigation microcomputer 110 performed by the audio microcomputer 120 is as already described with reference to FIG. 3 and therefore redundant descriptions will be omitted. In the following, a concrete example of the instruction for recovering the navigation microcomputer 110 sent from the switch microcomputer 220 will be described.

For example, the switch microcomputer 220 and the CAN microcomputer 170 are connected to each other via an integrated circuit, such as a UART (Universal Asynchronous Receiver Transmitter) that converts a serial signal and a parallel signal into each other.

Upon reception of the recovery operation, the switch microcomputer 220 outputs a low-level serial signal to the audio microcomputer 120 via the CAN microcomputer 170 for a predetermined time, such as for 100 ms.

Upon reception of the low-level serial signal for 100 ms, the audio microcomputer 120 determines that the instruction for recovering the navigation microcomputer 110 has been received, and performs the recovery process for the navigation microcomputer 110.

When the car navigation equipment enters the freeze state and then no recovery operation is performed in a predetermined time, the CAN microcomputer 170 instructs the audio microcomputer 120 to recover the navigation microcomputer 110.

Specifically, the CAN microcomputer 170 demands the recovery of the navigation microcomputer 110 by terminating the transmission of the serial signal to the audio microcomputer 120.

When the serial signal received from the CAN microcomputer 170 maintains a low-level, the audio microcomputer 120 determines that the serial signal is interrupted, and performs the recovery process for the navigation microcomputer 110. Thus, the audio microcomputer 120 determines whether the instruction for recovering the navigation microcomputer 110 is due to the recovery operation, based on the received signal.

As illustrated in FIG. 9, the display 200 connected to the in-vehicle system 100 includes the switch 210 for receiving the recovery operation for the navigation microcomputer 110. Thus, the freeze state can be removed by operating the switch located near the display, where the operation is relatively easy. Accordingly, the freeze state can be removed easily by the user even when the vehicle is travelling when user operation is difficult.

While not illustrated, the in-vehicle system and the display may be integrated. For example, the navigation microcomputer and the display are connected via the audio microcomputer, so that the audio microcomputer can receive the recovery operation for the navigation microcomputer when the switch is long-pressed.

Thus, in accordance with the present embodiment, when the car navigation equipment mounted on the vehicle enters the freeze state, the recovery operation for the navigation microcomputer is received via a predetermined operation, such as the long pressing of a button, and then the process of recovering the navigation microcomputer is performed. Accordingly, the freeze state can be appropriately removed even when the vehicle is travelling without detracting from convenience.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An in-vehicle system comprising:
a detection unit configured to detect a freeze state of a navigation apparatus mounted on a vehicle and providing route information including a current position of the vehicle;
a reception unit configured to receive a recovery operation from a user demanding recovery of the navigation apparatus;
a recovery unit configured to perform a recovery process for the navigation apparatus upon detection of the freeze state of the navigation apparatus by the detection unit and upon reception of the recovery operation by the reception unit; and
an activation information storage unit configured to store activation information indicating an activation state of the navigation apparatus, wherein the navigation apparatus includes a restoration unit configured to restore the navigation apparatus back to the activation state immediately before the occurrence of a freeze based on the activation information stored in the activation information storage unit, after the recovery process performed by the recovery unit.

2. The in-vehicle system according to claim 1, wherein the recovery unit is configured to stop the supply of power to the navigation apparatus and then perform a process of starting the supply of power as the recovery process.

3. The in-vehicle system according to claim 1, further comprising:
an identify unit configured to identify a cause of ceasing of activation of the navigation apparatus; and
an update unit configured to update software in the navigation apparatus based on the cause identified by the identify unit.

4. The in-vehicle system according to claim 2, further comprising:
an identify unit configured to identify a cause of ceasing of activation of the navigation apparatus; and
an update unit configured to update software in the navigation apparatus based on the cause identified by the identify unit.

5. An in-vehicle system comprising:
a detection unit configured to detect a freeze state of a navigation apparatus mounted in a vehicle and configured to provide route information including a current position of the vehicle; and
a recovery unit configured to stop a supply of power to the navigation apparatus upon detection of the freeze state by the detection unit and then perform a recovery process for starting the supply of power; and
an activation information storage unit configured to store activation information indicating an activation state of the navigation apparatus, wherein the navigation apparatus includes a restoration unit configured to restore the navigation apparatus back to the activation state immediately before the occurrence of a freeze based on the activation information stored in the activation information storage unit, after the recovery process performed by the recovery unit.

6. An in-vehicle system comprising:
a detection means for detecting a freeze state of a navigation apparatus mounted in a vehicle and providing route information including a current position of the vehicle;
a reception means for receiving a recovery operation from a user demanding recovery of the navigation apparatus;
a recovery means for performing a recovery process for the navigation apparatus upon detection of the freeze state of the navigation apparatus by the detection means and upon reception of the recovery operation by the reception means;

an activation information storage means for storing information indicating an activation state of the navigation apparatus, wherein the navigation apparatus includes a restoration unit configured to restore the navigation apparatus back to the activation state immediately before the occurrence of a freeze based on the activation information stored in the activation information stored in the activation information storage means, after the recovery process performed by the recovery means.

\* \* \* \* \*